(12) United States Patent
Conn

(10) Patent No.: US 12,304,544 B2
(45) Date of Patent: May 20, 2025

(54) DOUBLE DECKER WAGON

(71) Applicant: Westfield Outdoor, Inc., Indianapolis, IN (US)

(72) Inventor: Colton Todd Conn, Carmel, IN (US)

(73) Assignee: Westfield Outdoor, Inc., Indianapolis, IN (US)

( * ) Notice: Subject to any disclaimer, the term of this patent is extended or adjusted under 35 U.S.C. 154(b) by 306 days.

(21) Appl. No.: 17/967,098

(22) Filed: Oct. 17, 2022

(65) Prior Publication Data

US 2024/0124040 A1    Apr. 18, 2024

(51) Int. Cl.
*B62B 3/02* (2006.01)
*B62B 3/00* (2006.01)
*B62B 5/06* (2006.01)

(52) U.S. Cl.
CPC .............. *B62B 3/022* (2013.01); *B62B 3/007* (2013.01); *B62B 3/025* (2013.01); *B62B 5/067* (2013.01); *B62B 2205/02* (2013.01); *B62B 2205/06* (2013.01); *B62B 2205/33* (2013.01)

(58) Field of Classification Search
CPC ......... B62B 3/022; B62B 3/007; B62B 3/025; B62B 5/067; B62B 2205/02; B62B 2205/06; B62B 2205/33
See application file for complete search history.

(56) References Cited

U.S. PATENT DOCUMENTS

| | | |
|---|---|---|
| 1,771,836 A | 7/1930 | Beckham |
| 1,919,103 A | 7/1933 | Dolge |
| 1,998,269 A | 4/1935 | Brown |
| 2,016,232 A | 10/1935 | Floyd |
| 2,020,766 A | 11/1935 | Brown |
| 2,036,455 A | 4/1936 | Brown |

(Continued)

FOREIGN PATENT DOCUMENTS

| | | | |
|---|---|---|---|
| CN | 202806814 U | | 3/2013 |
| CN | 106428152 A | * | 2/2017 |

(Continued)

OTHER PUBLICATIONS

CN-208868091-U English Translation (Year: 2019).*
CN-106428152-A English Translation (Year: 2017).*

*Primary Examiner* — James A Shriver, II
*Assistant Examiner* — Michael T. Walsh
(74) *Attorney, Agent, or Firm* — Thompson Coburn LLP

(57) ABSTRACT

A wagon is adjustable between a collapsed configuration, an intermediate configuration, and an expanded configuration. The frame has a vertical pole assembly arranged at each of the four corners of the frame. Each of the vertical pole assemblies comprises an extension member telescopically arranged with a fixed member and a slider operatively slidingly connected with the fixed member. When the frame is altered from the expanded configuration to the intermediate configuration, the slider of each vertical pole assembly moves away from the distal end of the fixed member toward the proximal end of the fixed member and the extension member moves from the raised position to the lowered position. When the frame is altered from the intermediate configuration to the collapsed configuration, the extension member moves from the lowered position to the raised position with the slider at or adjacent to the proximal end of the fixed member.

19 Claims, 8 Drawing Sheets

(56) References Cited

U.S. PATENT DOCUMENTS

| | | |
|---|---|---|
| 2,049,683 A | 8/1936 | Baumgardner |
| 2,421,751 A | 6/1947 | Giordano |
| D177,208 S | 3/1956 | Berlin |
| 3,945,660 A | 3/1976 | Zalewski |
| 4,055,357 A | 10/1977 | Sorocin |
| 4,735,426 A | 4/1988 | McConnell |
| 5,222,748 A | 6/1993 | Johnson |
| 5,288,098 A * | 2/1994 | Shamie .................. B62B 7/083 280/42 |
| 5,649,718 A | 7/1997 | Groglio |
| 5,915,723 A | 6/1999 | Austin |
| 6,179,374 B1 | 1/2001 | Tang |
| 6,260,566 B1 | 7/2001 | LaFave et al. |
| 6,276,548 B1 | 8/2001 | Mitchell |
| 6,354,619 B1 | 3/2002 | Kim |
| 6,378,893 B1 | 4/2002 | Jager |
| 6,438,773 B1 | 8/2002 | Hsia |
| 6,491,318 B1 | 12/2002 | Galt et al. |
| 6,845,991 B1 | 1/2005 | Ritucci et al. |
| 6,929,230 B2 | 8/2005 | Tsai |
| 7,097,182 B1 | 8/2006 | Liu |
| 7,163,364 B2 | 11/2006 | Brazell |
| 7,163,228 B2 | 1/2007 | Faber |
| D551,723 S | 9/2007 | Schlegel et al. |
| D551,724 S | 9/2007 | Seckel et al. |
| 7,281,731 B2 | 10/2007 | Shamah |
| 7,503,085 B2 | 3/2009 | Harrison et al. |
| 7,547,037 B2 | 6/2009 | Poppinga et al. |
| 7,625,033 B2 | 12/2009 | Michelau et al. |
| 7,731,221 B2 | 6/2010 | Bess |
| 7,770,913 B2 | 8/2010 | Cannon |
| 8,011,686 B2 * | 9/2011 | Chen ...................... B62B 3/106 280/87.01 |
| 8,024,825 B2 | 9/2011 | Harrison et al. |
| 8,162,349 B1 | 4/2012 | Roselle |
| 8,220,824 B2 | 7/2012 | Chen et al. |
| 8,388,015 B2 | 3/2013 | Chen |
| 8,882,135 B1 | 11/2014 | Chen |
| 8,882,136 B2 | 11/2014 | Glaser et al. |
| 8,973,940 B2 | 3/2015 | Chen et al. |
| 9,056,621 B1 | 6/2015 | Jin et al. |
| 9,073,564 B2 | 7/2015 | Yang et al. |
| 9,082,311 B2 | 7/2015 | Franzblau |
| 9,085,311 B1 | 7/2015 | Chen |
| 9,101,206 B1 | 8/2015 | Chen et al. |
| 9,108,656 B1 | 8/2015 | Nolan et al. |
| 9,145,154 B1 | 9/2015 | Horowitz |
| 9,211,897 B2 | 12/2015 | Yang et al. |
| D748,739 S | 2/2016 | Horowitz |
| 9,327,749 B2 | 5/2016 | Young et al. |
| 9,561,151 B2 * | 2/2017 | Opsetmoen ............ A45B 11/00 |
| 9,580,095 B2 | 2/2017 | Vargas, II et al. |
| 9,623,890 B1 * | 4/2017 | Horowitz ................ B62B 3/007 |
| D794,133 S | 8/2017 | Ostergaard et al. |
| 9,738,298 B1 * | 8/2017 | Yang ...................... B62B 3/025 |
| 9,771,093 B2 | 9/2017 | Horowitz |
| 9,956,981 B1 | 5/2018 | Fitzwater et al. |
| 10,081,380 B2 | 9/2018 | Fitzwater et al. |
| 10,099,711 B1 | 10/2018 | Sun |
| 10,099,712 B1 | 10/2018 | Sun |
| 10,300,933 B2 | 5/2019 | DeBry |
| 10,300,934 B2 | 5/2019 | Ostergaard |
| 10,392,042 B2 | 8/2019 | Fitzwater et al. |
| 10,399,586 B1 | 9/2019 | Huang |
| 10,633,010 B1 * | 4/2020 | Zhang .................... B62B 3/025 |
| 10,703,399 B2 * | 7/2020 | Ostergaard ............. B62B 3/008 |
| D929,063 S | 8/2021 | Zhang |
| 11,332,178 B2 * | 5/2022 | Yang ...................... B62B 5/067 |
| 11,370,467 B1 * | 6/2022 | Horowitz ................ B62B 3/007 |
| 11,685,416 B2 * | 6/2023 | Yang ...................... B62B 3/025 280/651 |
| 2003/0025301 A1 | 2/2003 | Banuelos, III |
| 2007/0284900 A1 | 12/2007 | Sze |
| 2008/0217886 A1 | 9/2008 | Poppinga et al. |
| 2009/0194975 A1 * | 8/2009 | Harrison ............. A61G 5/0825 280/649 |
| 2010/0090444 A1 | 4/2010 | Chen et al. |
| 2010/0156069 A1 | 6/2010 | Chen |
| 2011/0204598 A1 | 8/2011 | Stevenson |
| 2015/0035258 A1 | 2/2015 | Chen et al. |
| 2016/0347338 A1 | 12/2016 | Vargas, II et al. |
| 2018/0057035 A1 * | 3/2018 | Choi ........................ B62B 9/26 |
| 2018/0118243 A1 | 5/2018 | Fitzwater et al. |
| 2018/0327011 A1 | 11/2018 | Horowitz et al. |
| 2019/0092363 A1 | 3/2019 | Ostergaard et al. |
| 2021/0300450 A1 | 9/2021 | Yang |
| 2023/0094718 A1 * | 3/2023 | Zhou ...................... B62B 3/025 280/651 |

FOREIGN PATENT DOCUMENTS

| | | | |
|---|---|---|---|
| CN | 206406949 U | | 8/2017 |
| CN | 208868091 U | * | 5/2019 ............ B62B 3/007 |

* cited by examiner

DOUBLE DECKER WAGON

BACKGROUND AND SUMMARY

This disclosure pertains to a double decker wagon.

One aspect of the disclosure is a wagon comprising a frame and four wheels. The wagon is adjustable between a collapsed configuration, an intermediate configuration, and an expanded configuration.

The frame has opposite lateral sides, opposite front and rear sides, and four corners. The frame has a vertical pole assembly arranged at each of the four corners of the frame. Each of the vertical pole assemblies comprises an extension member telescopically arranged with a fixed member and a slider operatively slidingly connected with the fixed member. The extension member is movable relative to the fixed member between raised and lowered positions on each vertical pole assembly. The extension member has opposite proximal and distal ends. The fixed member has opposite proximal and distal ends. The frame has a lateral side cross-member assembly extending along each lateral side of the frame between respective vertical pole assemblies. Each of the lateral side cross-member assemblies has opposite upper ends operatively connected to the distal end of the extension member of the respective vertical pole assembly. Each of the lateral side cross-member assemblies has opposite lower ends operatively connected to the slider of the fixed member of the respective vertical pole assembly.

When the frame is altered from the wagon's expanded configuration to the wagon's intermediate configuration, the slider of each vertical pole assembly moves away from the distal end of the fixed member toward the proximal end of the fixed member and the extension member moves from the raised position to the lowered position. When the frame is altered from the wagon's intermediate configuration to the wagon's collapsed configuration, the extension member moves from the lowered position to the raised position with the slider at or adjacent to the proximal end of the fixed member. Each wheel is operatively connected adjacent the proximal end of the fixed member.

Another aspect of the disclosure is a wagon comprising a frame and four wheels. The wagon is adjustable between a collapsed configuration, an intermediate configuration, and an expanded configuration.

The frame has four sides. Each side is formed by a respective cross-member assembly. The frame also has a vertically oriented telescoping pole assembly at the intersection of each pair of the cross-member assemblies. The vertically oriented telescoping pole assembly has an extension member movable relative to a fixed member. Each of the cross-member assemblies has opposite upper ends that are operatively connected to the extension member of the vertically oriented telescoping pole assembly. Each of the cross-member assemblies have opposite lower ends that are operatively slidingly connected to the fixed member of the vertically oriented telescoping pole assembly.

The frame is such that: (i) as the wagon is altered from the wagon's collapsed configuration to the wagon's intermediate configuration, the cross-member assemblies decrease in height, the cross-member assemblies increase in width, and the vertically oriented telescoping pole assemblies decrease in height; (ii) as the wagon is altered from the wagon's intermediate configuration to the wagon's expanded configuration, the vertically oriented telescoping pole assemblies increase in height with no change in a height and width of the cross-member assemblies; (iii) as the wagon is altered from the wagon's expanded configuration to the wagon's intermediate configuration, the vertically oriented telescoping pole assemblies decrease in height with no change in a height and width of the cross-member assemblies; and (iv) as the wagon is altered from the wagon's intermediate configuration to the wagon's collapsed configuration, the cross-member assemblies increase in height, the cross-member assemblies decrease in width, and the vertically oriented telescoping pole assemblies increase in height.

Each wheel is operatively attached to a bottom end portion of a respective one of the vertically oriented telescoping pole assemblies.

Further features and advantages, as well as the operation, are described in detail below with reference to the accompanying drawings.

Figure 1:
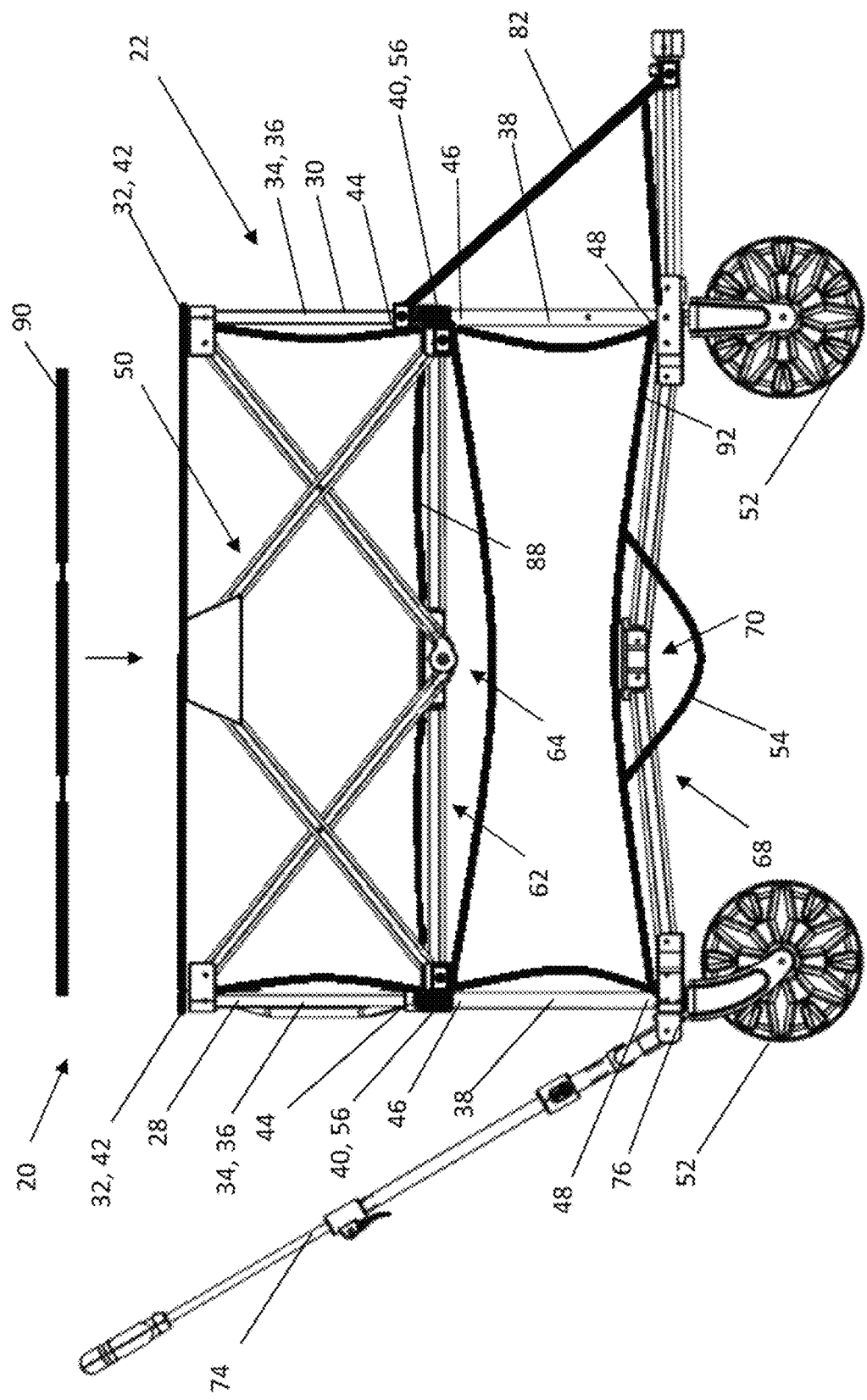
FIG. 1 is a right side view of an exemplary wagon in an expanded configuration.
Figure 2:
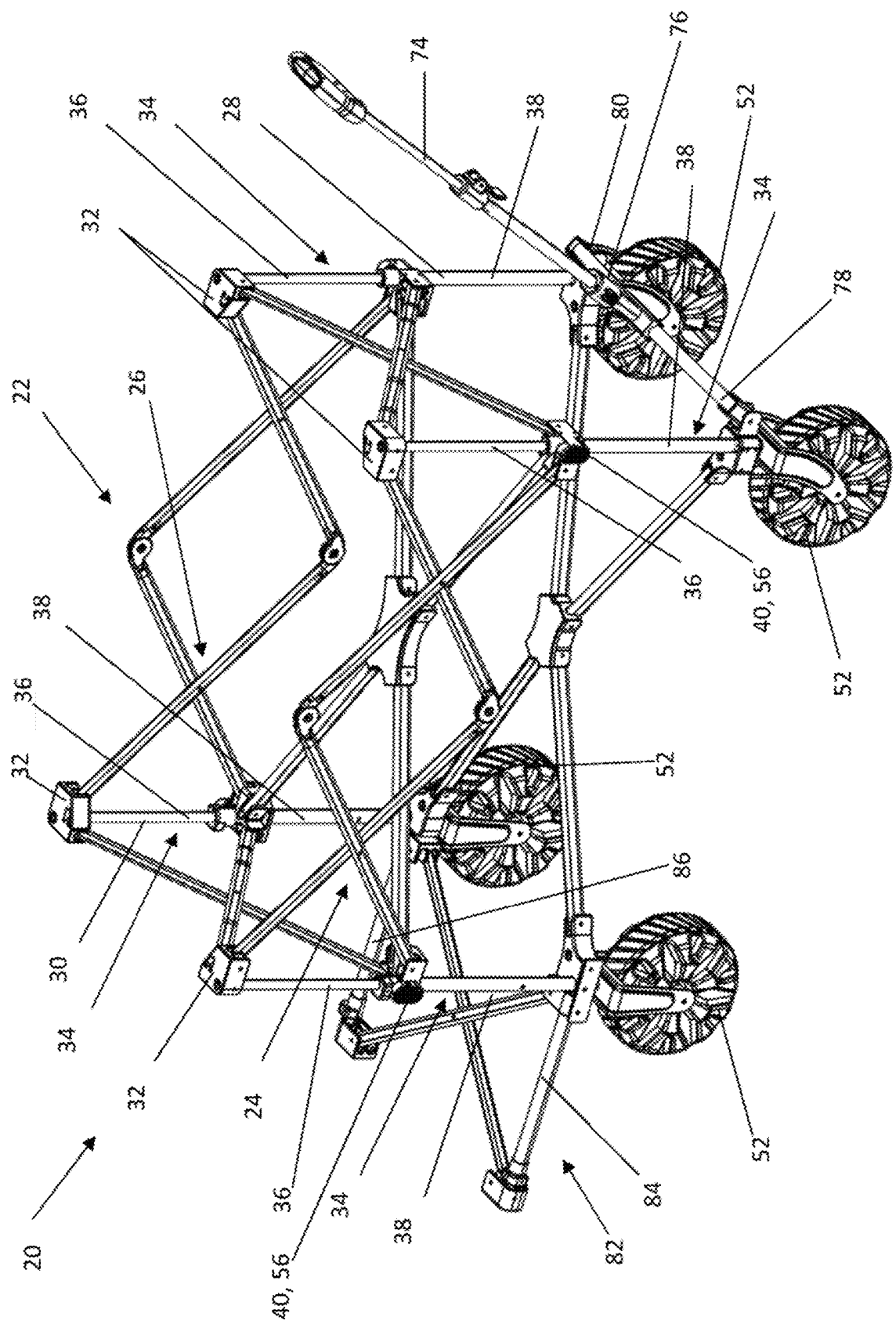
FIG. 2 is a front-left isometric view of a frame of the wagon of FIG. 1.
Figure 3:
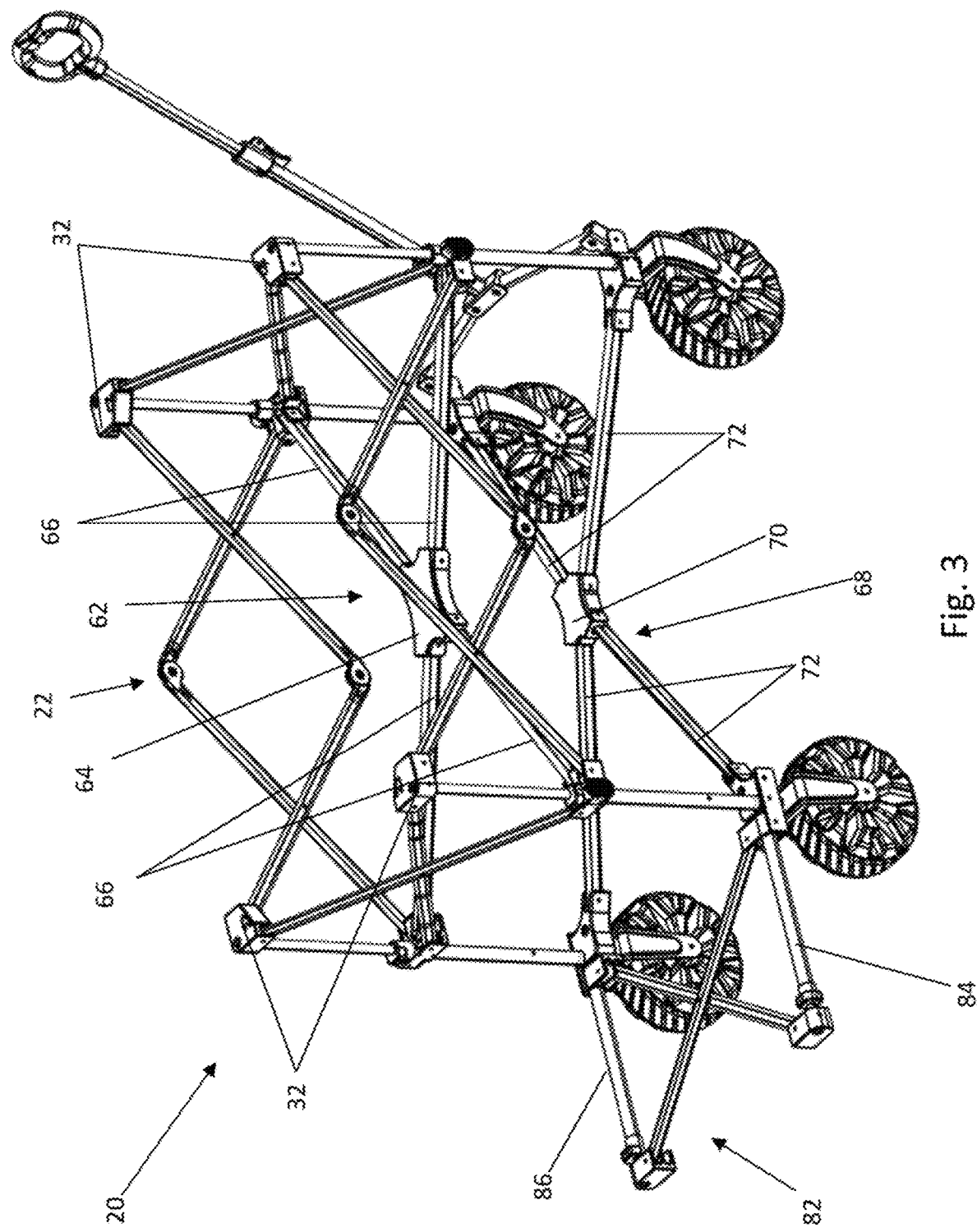
FIG. 3 is rear isometric view of the frame of the wagon of FIG. 2.
Figure 4:
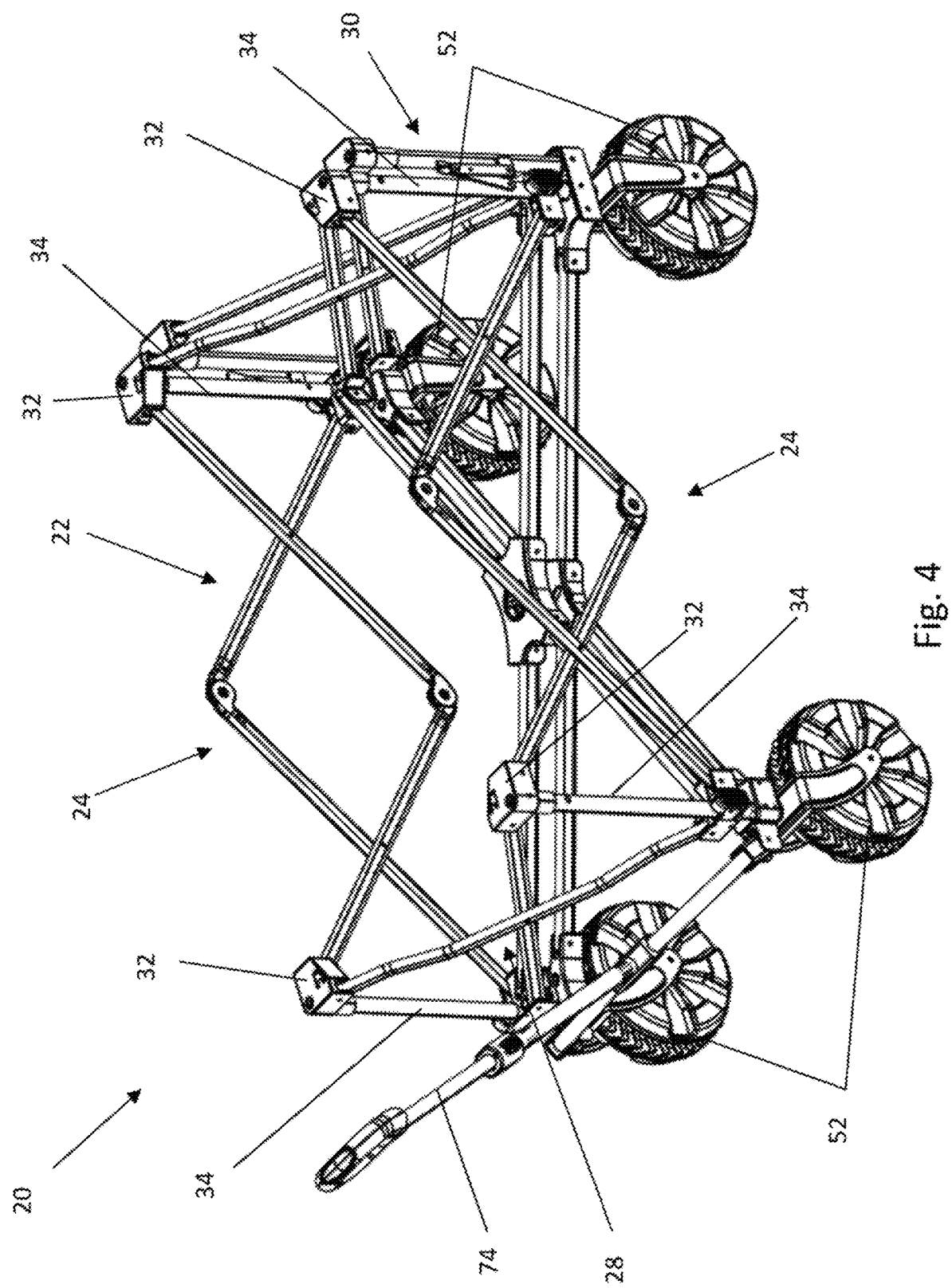
FIG. 4 is front-right isometric view of the frame of the wagon in an intermediate configuration.
Figure 5:
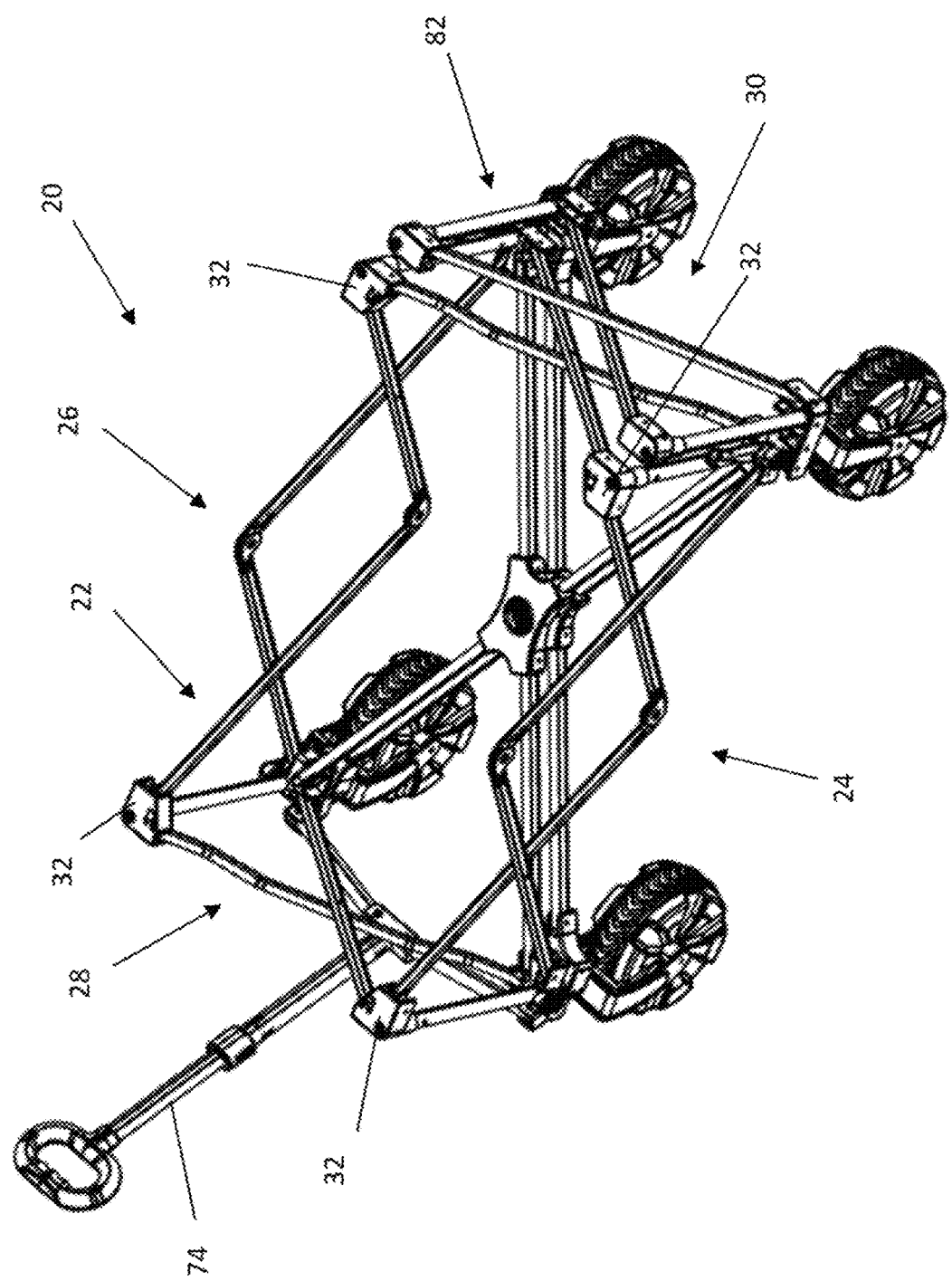
FIG. 5 is a top isometric view of the frame of the wagon of FIG. 4.
Figure 6:
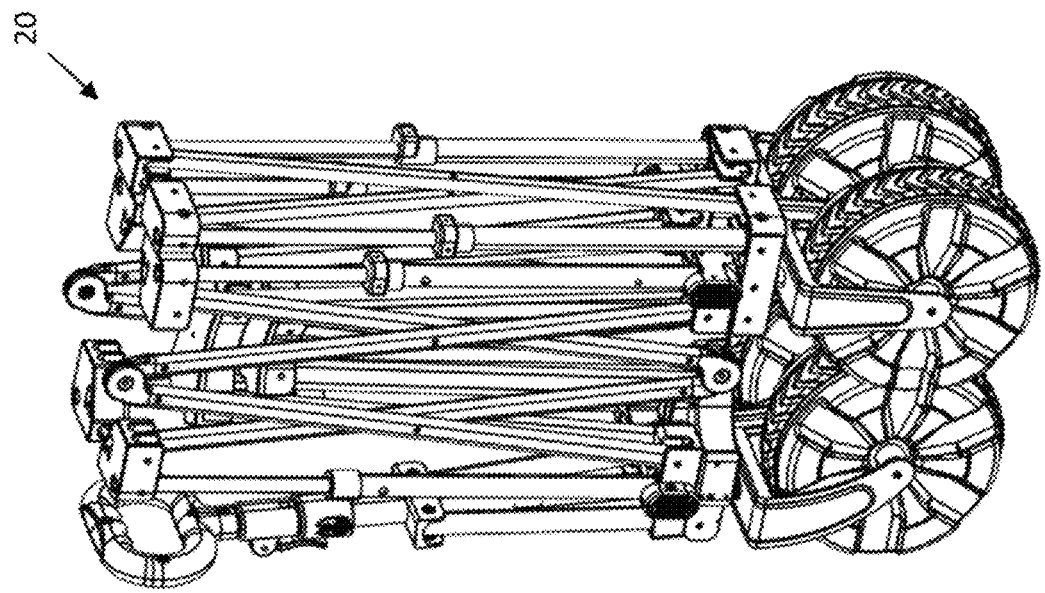
FIG. 6 is a left side view of the frame of the wagon in the collapsed configuration.
Figure 7:
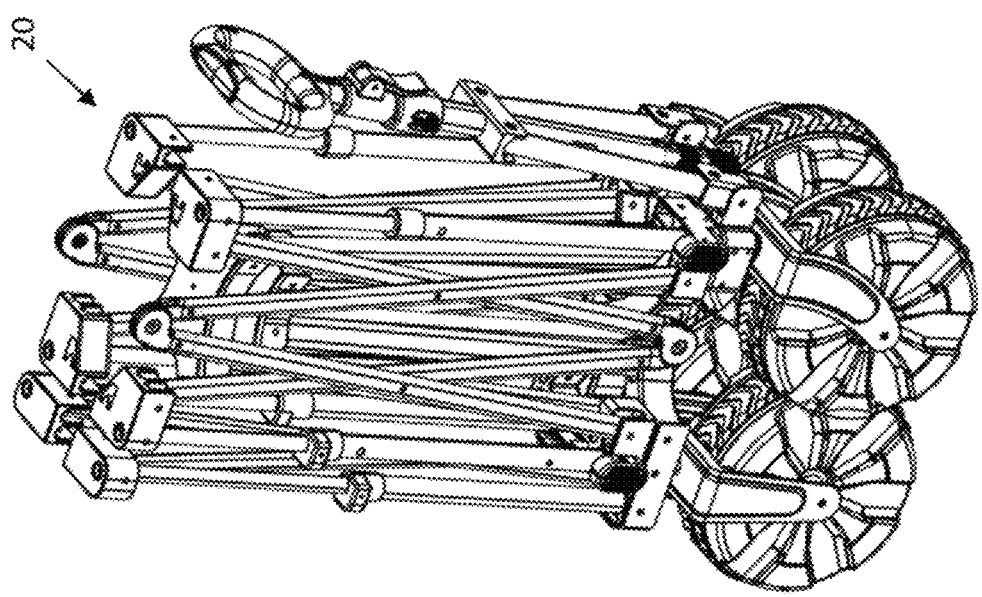
FIG. 7 is a right side view of the frame of the wagon of FIG. 6.
Figure 8:
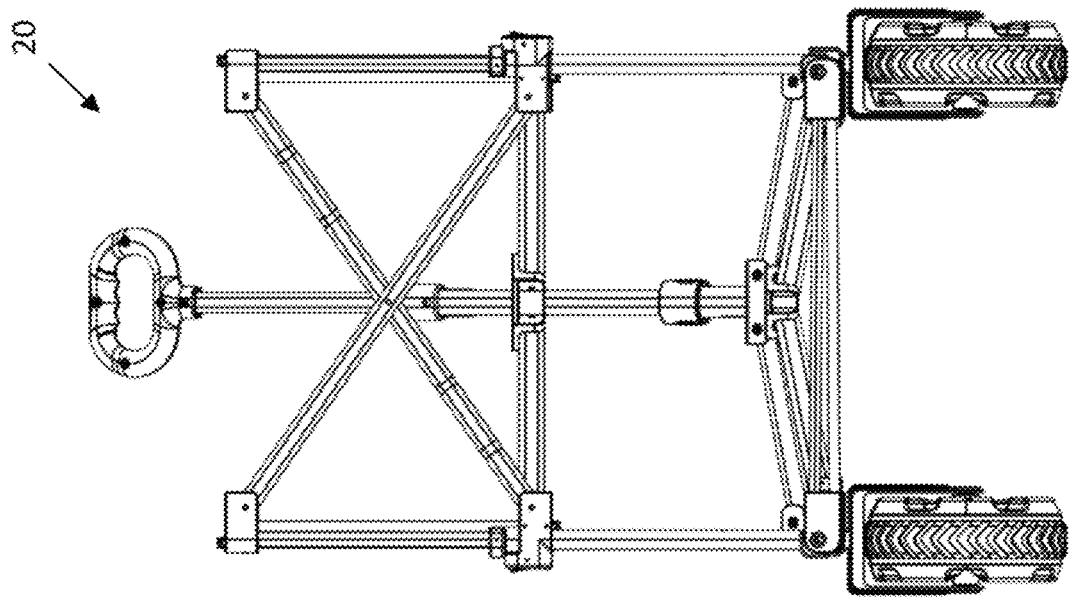
FIG. 8 is a front view of the frame of the wagon of FIG. 2.
Figure 9:
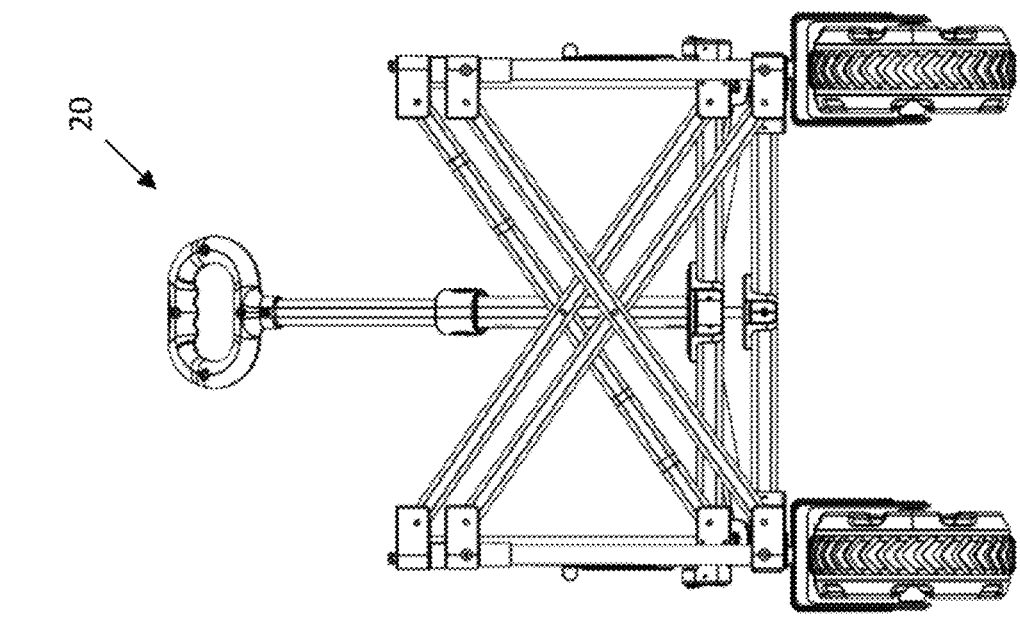
FIG. 9 is a front view of the frame of the wagon of FIG. 4.
Figure 10:
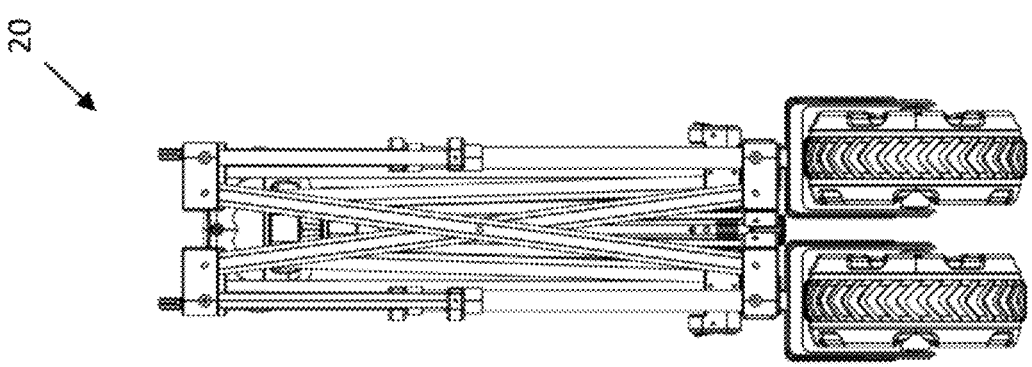
FIG. 10 is a front view of the frame of the wagon of FIG. 6.
Figure 11:
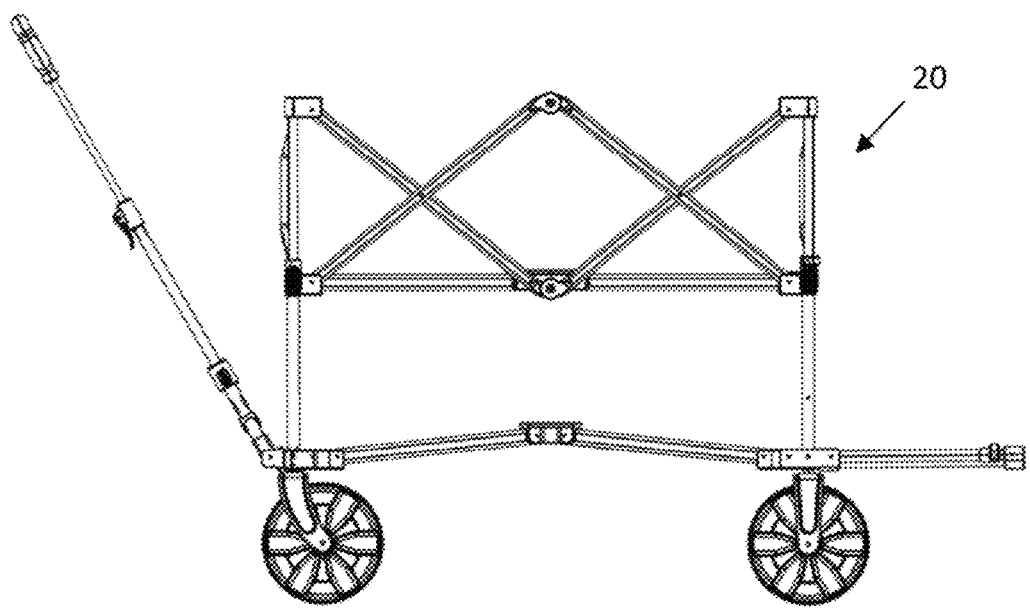
FIG. 11 is a right side view of the frame of the wagon of FIG. 2.
Figure 12:
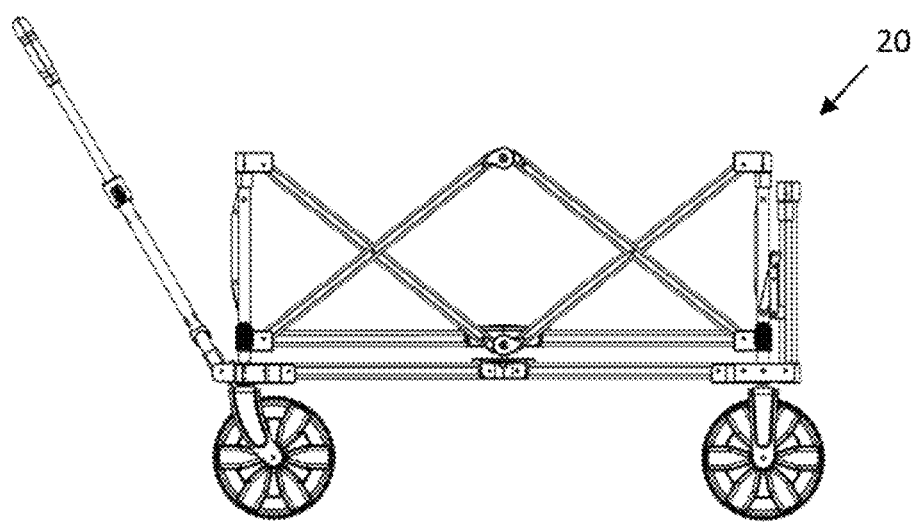
FIG. 12 is a right side view of the frame of the wagon of FIG. 4.
Figure 13:
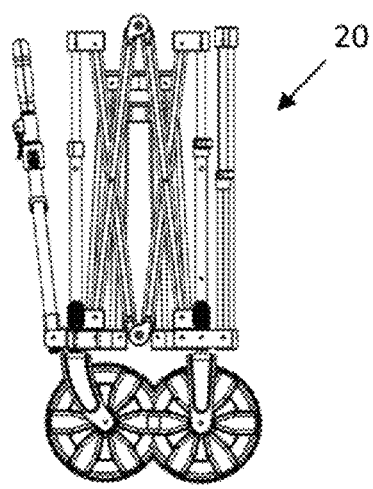
FIG. 13 is a right side view of the frame of the wagon of FIG. 6.

Reference numerals in the written specification and in the figures indicate corresponding items.

DETAILED DESCRIPTION

An embodiment of a wagon, generally indicated by the reference number (20) is shown in FIGS. 1-13. The wagon (20) may comprise a frame (22) and four wheels (52). The wagon may be adjustable between a collapsed configuration (FIGS. 6-7, 10, and 13), an intermediate configuration (FIGS. 4-5, 9, and 12), and an expanded configuration (FIGS. 1-3, 8, and 11).

The frame (22) may have opposite lateral sides (24, 26), opposite front and rear sides (28, 30), and four corners (32). The frame (22) may have a vertical pole assembly (34) arranged at each of the four corners (32) of the frame 22. Each of the vertical pole assemblies (34) may comprise an extension member (36) telescopically arranged with a fixed member (38) and a slider (40) operatively slidingly connected with the fixed member (38). The extension member (36) may be movable relatively to the fixed member (38) between raised and lowered positions on each vertical pole assembly (34). In the drawings, the extension member (36) is arranged to slide in a bore of the fixed member (38). The extension member (36) may also be arranged to slide on at least a portion of the outer diameter of the fixed member.

The extension member (36) may have opposite proximal and distal ends (42, 44). The fixed member (38) may have opposite proximal and distal ends (46, 48). The frame (22) may have a lateral side cross-member assembly (50) along each lateral side of the frame between respective vertical pole assemblies. Each of the lateral side cross-member assemblies (50) may have opposite ends operatively connected to the distal end (44) of the extension member (36) of the respective vertical pole assembly (34). Each of the lateral side cross member assemblies (50) may have opposite lower ends operatively connected to the slider (40) of the fixed member (38) of the respective vertical pole assembly (34). Each of the lateral side cross member assemblies (50) may comprise a plurality of crossed bars connected to each other. The cross member assemblies (50) may be scissor bar assemblies that are pivotally connected to each other with a lateral offset between the bars based on the thickness of the bars. In the alternative, the cross member assemblies (50) may comprise a primary cross bar, a first secondary cross bar, and a second secondary cross bar, where the first and second secondary cross bars are pivotally connected to a hub, and the primary cross bar passes through an opening of the hub without intersecting the first and second secondary cross bars and with no lateral offset between the primary cross bar and the first and second secondary cross bars.

When the frame (22) is altered from the wagon's expanded configuration to the wagon's intermediate configuration, the slider (40) of each vertical pole assembly (34) may move away from the distal end (48) of the fixed member (38) toward the proximal end (46) of the fixed member (38), and the extension member (36) may move from the raised position to the lowered position. When the extension member (36) moves from the raised position to the lowered position, the distal end (44) of the extension member (36) may move toward and may come adjacent the distal end (48) of the fixed member (38). When the frame is altered from the wagon's intermediate configuration to the wagon's collapsed configuration, the extension member (36) may move from the lowered position to the raised position with the slider (40) at or adjacent to the proximal end (46) of the fixed member (38).

Making reference to FIGS. 8-13, when the wagon (20) is altered from the wagon's collapsed configuration to the wagon's intermediate configuration, the cross-member assemblies (50, 58, and 60) may decrease in height, the cross-member assemblies may increase in width, and the vertically oriented telescoping pole assemblies (34) may decrease in height. When the wagon (20) is altered from the wagon's intermediate configuration to the wagon's expanded configuration, the vertically oriented telescoping pole assemblies (34) may increase in height with no change in a height and width of the cross-member assemblies (50, 58, and 60). When the wagon (20) is altered from the wagon's expanded configuration to the wagon's intermediate configuration, the vertically oriented telescoping pole assemblies (34) may decrease in height with no change in a height and width of the cross-member assemblies (50, 58, and 60). When the wagon (20) is altered from the wagon's intermediate configuration to the wagon's collapsed configuration, the cross-member assemblies (50, 58, and 60) may increase in height, the cross-member assemblies (50, 58, and 60) may decrease in width, and the vertically oriented telescoping pole assemblies (34) may increase in height. The height and width of the cross-member assemblies (50, 58, and 60) may be the same in the intermediate configuration as in the expanded configuration.

The frame (22) may further comprise a locking tab (56) on the slider (40) of at least one of the vertical pole assemblies (34). The locking tab (56) may be adapted and configured to engage the distal end (48) of the fixed member (38) to secure the wagon in the expanded configuration. The locking tab (56) may comprise a toggle button where depressing one side of the toggle button will cause a pin of the slider (40) to disengage from a hole formed in the distal end (48) of the fixed member (38), thereby enabling the user to transition the wagon from the expanded configuration to the intermediate configuration. Release of the toggle button will allow the pin of the slider (40) to be urged by spring pressure against an outer surface of the fixed member and into the hole formed in the distal end of the fixed member, thereby enabling the user to transition the wagon from the intermediate configuration to the expanded configuration. The locking tab (56) may also comprise a clamp or other mechanical fastener. The locking tab (56) may also be configured to receive a projection that is urged outward from fixed member (38). The locking tab (56) may be adapted and configured to engage adjacent to or at the proximal end (48) of the fixed member (38) to secure the wagon in the intermediate configuration. In such an embodiment, the proximal end of the fixed member may be provided with a hole that cooperates with a pin of the toggle button. Or, as the case may be, the locking tab (56) may comprise a clamp or other mechanical fastener, or the locking tab (56) may be configured to receive a projection that is urged outward from fixed member (38).

The frame (22) may further comprise a front cross-member assembly (58) extending across the front side (28) of the frame (22) between respective vertical pole assemblies (34). The front side cross-member assembly (58) may have opposite upper ends operatively connected to the distal end (44) of the extension member (36) of the respective vertical pole assembly (34). The front side cross-member assembly (58) may have opposite lower ends operatively connected to the slider (40) of the fixed member (38) of the respective vertical pole assembly (34).

Similarly, the frame (22) may further comprise a rear cross-member assembly (60) extending across the rear side (30) of the frame (22) between respective vertical pole assemblies (34). The rear side cross-member assembly (60) may have opposite upper ends operatively connected to the distal end (44) of the extension member (36) of the respective vertical pole assembly (34). The rear side cross-member assembly (60) may have opposite lower ends operatively connected to the slider (40) of the fixed member (38) of the respective vertical pole assembly (34).

The frame may further comprise a first bottom support assembly (62). The first bottom support assembly (62) may comprise a central hub (64) and four bars (66). Each bar (66) may have one end operatively pivotally connected to the central hub (64) and an opposite end operatively pivotally connected to the slider (40) of the respective vertical pole assembly (34). The frame may further comprise a second bottom support assembly (68). The second bottom support assembly (68) may comprise a central hub (70) and four bars (72). Each bar (72) may have one end operatively pivotally connected to the central hub (70) and an opposite end operatively pivotally connected adjacent the proximal end of the respective vertical pole assembly (34). The central hub (64) of the first bottom support assembly (62) may be shaped and sized to nest with the central hub (70) of the second bottom support assembly (68) so as to facilitate placing the wagon in the intermediate configuration.

Each of the four wheels (52) may be operatively connected adjacent the proximal end (46) of the fixed member (38).

The wagon (20) may further comprise a tow handle (74). The tow handle (74) may have a base (76) with first and second arms (78, 80) extending laterally opposite each other from the base (76). The first arm (78) may be operatively connected adjacent the proximal end (46) of the fixed member (38) of one of the vertical pole assemblies (34) at the front side (28) of the frame (22). The second arm (80) may be operatively connected adjacent the proximal end (46) of the fixed member (38) of the other of the vertical pole assemblies (34) at the front side (22) of the frame (22). The tow handle (62) may comprise a telescoping tow handle (62).

The wagon (20) may further comprise a tailgate (82). The tailgate may have first and second arms (84, 86). The first arm (84) may be operatively connected adjacent the proximal end (46) of the fixed member (38) of one of the vertically oriented telescopic pole assemblies (34) at a side of the frame (22). The second arm (86) may be operatively connected adjacent the proximal (46) end of the fixed member (38) of the other vertical oriented telescopic pole assemblies (34) of the side of the frame (22). The tailgate (82) may be movable between an upright position where the tailgate is generally parallel to the rear frame and an extended position where the tailgate forms an angle between 20° and 90° with respect to the rear frame.

The wagon (20) may further comprise a pliable liner (88) with a stiffener panel (90), and may include a bottom shelf or container (92) that is arranged below the pliable liner (as shown in FIG. 1). When the wagon (20) is in the expanded configuration, the first and second bottom support assemblies (62, 68) may be capable of supporting a downward acting load, and therefore the pliable liner (88) and the container (92) need not carry the entire load of cargo placed in the wagon (20). The pliable liner (88) may be spaced from the first bottom support assembly (62). The container (92) may be spaced from the second bottom support assembly (68). The pliable liner (88) may rest inside the frame (22) when the wagon (20) is in the expanded configuration. Each upper corner of the pliable liner (88) may be removably attachable to the top portion of a respective one of the vertical pole assemblies (34). The pliable liner (88) may comprise a plurality of flaps (not shown) having hook and loop fasteners (such as Velcro™) that extend downward from the base of the pliable liner. The flaps may be used to secure the base of the pliable liner to the first bottom support assembly (62) and/or the frame (22). The pliable liner (88) may include a pair of inverted pockets (now shown) and a pliable fabric handle (not shown) in the center of the pliable liner. When the wagon (20) is in the intermediate configuration, the fabric handle may be configured to allow the pliable liner (88) to be pulled upward which may in turn cause the wagon to move from the intermediate configuration to the collapsed configuration.

The stiffening panel (90) may be comprised of adjacent panels with fold lines and that are wrapped in a pliant or fabric-like material in a manner such that the stiffening panel can be folded like an accordion. When unfolded, the stiffening panel (90) can be placed in the bottom of the pliable liner (88). The stiffening panel (90) may help to distribute loads of any cargo being carried in the wagon (20) more evenly to the bottom support assembly (62) of the frame (22) and prevents the components of the bottom support assembly from being felt by children riding in the wagon. The container (92) may have a stiffening panel of similar construction.

The wagon (20) may further comprise a foot strap (54) on a lateral side of the frame. The foot strap (54) may be adapted and configured to facilitate the wagon's transition from the intermediate configuration to the extended configuration. The foot strap (54) may comprise a loop of material (fabric, plastic, etc.) which may be connected to the bottom container (92), or may be connected to the frame or comprise an integral component of the frame. The foot strap (54) may comprise an elastic material capable of being in an unstretched configuration next to the frame when not used and expanding to a stretched configuration to accommodate a foot of a user when used by a user to facilitate the wagon's transition from the intermediate configuration to the extended configuration.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A wagon that is adjustable between a collapsed configuration, an intermediate configuration, and an expanded configuration, the wagon comprising:

a frame, the frame having opposite lateral sides, opposite front and rear sides, and four corners, the frame having a vertical pole assembly arranged at each of the four corners of the frame, each of the vertical pole assemblies comprising an extension member telescopically arranged with a fixed member and a slider operatively slidingly connected with the fixed member, the extension member being movable relative to the fixed member between raised and lowered positions on each vertical pole assembly, the extension member having opposite proximal and distal ends, the fixed member having opposite proximal and distal ends, the frame having a lateral side cross-member assembly extending along each lateral side of the frame between respective vertical pole assemblies, each of the lateral side cross-member assemblies having opposite upper ends operatively connected to the distal end of the extension member of the respective vertical pole assembly, such that the opposite upper ends maintain a fixed position with respect to the distal end of the extension member, each of the lateral side cross-member assemblies having opposite lower ends operatively connected to the slider of the fixed member of the respective vertical pole assembly wherein when the frame is altered from the wagon's expanded configuration to the wagon's intermediate configuration, the slider of each vertical pole assembly moves away from the distal end of the fixed member toward the proximal end of the fixed member and the extension member moves from the raised position to the lowered position; and wherein when the frame is altered from the wagon's intermediate configuration to the wagon's collapsed configuration, the extension member moves from the lowered position to the raised position with the slider at or adjacent to the proximal end of the fixed member; and four wheels, each wheel being operatively connected adjacent the proximal end of the fixed member.

2. The wagon in accordance with claim 1 further comprising a foot strap on a lateral side of the frame, the foot strap being adapted and configured to facilitate the wagon's transition from the intermediate configuration to the extended configuration.

3. The wagon in accordance with claim 1 wherein the frame further comprises a locking tab on the slider of at least one of the vertical pole assemblies, the locking tabs being adapted and configured to engage the distal end of the fixed member to secure the wagon in the expanded configuration.

4. The wagon in accordance with claim 1 wherein the frame further comprises a front cross-member assembly extending across the front side of the frame between respective vertical pole assemblies, the front side cross-member assembly having opposite upper ends operatively connected to the distal end of the extension member of the respective vertical pole assembly, the front side cross-member assembly having opposite lower ends operatively connected to the slider of the fixed member of the respective vertical pole assembly.

5. The wagon in accordance with claim 1 wherein the frame further comprises a rear cross-member assembly extending across the rear side of the frame between respective vertical pole assemblies, the rear side cross-member assembly having opposite upper ends operatively connected to the distal end of the extension member of the respective vertical pole assembly, the rear side cross-member assembly having opposite lower ends operatively connected to the slider of the fixed member of the respective vertical pole assembly.

6. The wagon in accordance of claim 1 further comprising a tow handle, the tow handle having a base with first and second arms extending laterally opposite each other from the base, the first arm being operatively connected adjacent the proximal end of the fixed member of one of the vertical pole assemblies at the front side of the frame, the second arm being operatively connected adjacent the proximal end of the fixed member of the other of the vertical pole assemblies at the front side of the frame.

7. The wagon in accordance with claim 6, wherein the tow handle comprises a telescoping tow handle.

8. The wagon in accordance with claim 1, wherein each of lateral side cross-member assemblies comprises a plurality of pairs of crossed bars connected to each other.

9. The wagon in accordance with claim 1 wherein the frame further comprises a first bottom support assembly, the first bottom support assembly comprises a central hub and four bars, each bar having one end operatively pivotally connected to the central hub and an opposite end operatively pivotally connected to the slider of the respective vertical pole assembly.

10. The wagon in accordance with claim 9 wherein the frame further comprises a second bottom support assembly, the second bottom support assembly comprises a central hub and four bars, each bar having one end operatively pivotally connected to the second bottom support assembly central hub and an opposite end operatively pivotally connected adjacent the proximal end of the respective vertical pole assembly.

11. A wagon that is adjustable between a collapsed configuration, an intermediate configuration, and an expanded configuration, the wagon comprising:

a frame, the frame having four sides, each side being formed by a respective cross-member assembly, the frame also having a vertically oriented telescoping pole assembly at the intersection of each pair of the cross-member assemblies, the vertically oriented telescoping pole assembly having an extension member movable relative to a fixed member, each of the cross-member assemblies having opposite upper ends that are operatively connected to the extension member of the vertically oriented telescoping pole assembly, such that the opposite upper ends maintain a fixed position with respect to the distal end of the extension member, each of the cross-member assemblies having opposite lower ends that are operatively slidingly connected to the fixed member of the vertically oriented telescoping pole assembly, the frame being such that: (i) as the wagon is altered from the wagon's collapsed configuration to the wagon's intermediate configuration, the cross-member assemblies decrease in height, the cross-member assemblies increase in width, and the vertically oriented telescoping pole assemblies decrease in height; (ii) as the wagon is altered from the wagon's intermediate configuration to the wagon's expanded configuration, the vertically oriented telescoping pole assemblies increase in height with no change in a height and width of the cross-member assemblies; (iii) as the wagon is altered from the wagon's expanded configuration to the wagon's intermediate configuration, the vertically oriented telescoping pole assemblies decrease in height with no change in a height and width of the cross-member assemblies; and (iv) as the wagon is altered from the wagon's intermediate configuration to the wagon's collapsed configuration, the cross-member assemblies increase in height, the cross-member assemblies decrease in width, and the vertically oriented telescoping pole assemblies increase in height; and four wheels, each wheel being operatively attached to a bottom end portion of a respective one of the vertically oriented telescoping pole assemblies.

12. The wagon in accordance with claim 11, further comprising a foot strap arranged between the vertically oriented telescoping pole assemblies on a side of the wagon, the foot strap being adapted and configured to facilitate the wagon's transition from the intermediate configuration to the extended configuration.

13. The wagon in accordance with claim 11 further comprising a locking tab operatively connected to the lower end of at least one of the cross-member assemblies, the locking tabs being adapted and configured to secure the wagon in the expanded configuration.

14. The wagon in accordance with claim 11 wherein the frame further comprises a first bottom support assembly, the first bottom support assembly comprises a central hub and four bars, each bar having one end operatively pivotally connected to the central hub and an opposite end operatively pivotally connected to the slider of the respective vertical pole assembly.

15. The wagon in accordance with claim 14 wherein the frame further comprises a second bottom support assembly, the second bottom support assembly comprises a central hub and four bars, each bar having one end operatively pivotally connected to the second bottom support assembly central hub and an opposite end operatively pivotally connected adjacent the proximal end of the respective vertical pole assembly.

16. The wagon in accordance with claim 14 wherein a height and width of the cross member assemblies is the same in the intermediate configuration as in the expanded configuration.

17. The wagon in accordance of claim 11 further comprising a tow handle, the tow handle having a base with first and second arms extending laterally opposite each other from the base, the first arm being operatively connected adjacent the proximal end of the fixed member of one of the vertically oriented telescopic pole assemblies at a side of the frame, the second arm being operatively connected adjacent the proximal end of the fixed member of the other vertical oriented telescopic pole assemblies of the side of the frame.

18. The wagon in accordance with claim 17, wherein the tow handle comprises a telescoping tow handle.

19. The wagon in accordance with claim 11 further comprising a tailgate, the tailgate having first and second arms, the first arm being operatively connected adjacent the proximal end of the fixed member of one of the vertically oriented telescopic pole assemblies at a side of the frame, the second arm being operatively connected adjacent the proximal end of the fixed member of the other vertical oriented telescopic pole assemblies of the side of the frame.

* * * * *